United States Patent Office 3,576,844
Patented Apr. 27, 1971

3,576,844
N-ALKOXYCARBONYL-AMINOALKYL GUANIDINES
Nakao Ishida, Sendai-shi, Junki Katsube, Saitama-ken, and Shizuo Saito, Toyonaka-shi, Japan, assignors to Sumitomo Chemical Company, Ltd., Osaka, Japan
No Drawing. Filed Oct. 9, 1967, Ser. No. 673,969
Claims priority, application Japan, Oct. 13, 1966, 41/67,620
Int. Cl. C07c *133/10;* A01n *9/20*
U.S. Cl. 260—482        8 Claims

ABSTRACT OF THE DISCLOSURE

Guanidine derivatives having urethane linkages represented by the formula:

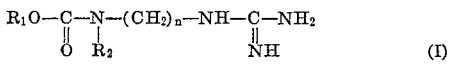

wherein $R_1$ is lower alkyl, $R_2$ is hydrogen atom or a lower alkyl, and $n$ is 2 or 3, and acid addition salts of the derivatives. Said guanidine derivatives and acid salts thereof have useful pharmacological actions such as antiviral and blood pressure lowering actions and the like.

Said derivatives and acid salts thereof are prepared by reacting an N-alkoxycarbonyl-alkylenediamine of the formula:

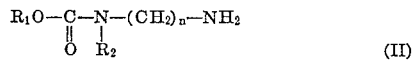

wherein $R_1$, $R_2$ and $n$ are the same as above, with an S-alkylisothiourea or cyanamide in the presence of an acid (e.g., hydrochloric, sulfuric, nitric or acetic acid), desirably using water or an alcohol as solvent, at a temperature of room temperature to boiling point of the solvent, and converting the product, if necessary, into a free base and further into another kind of acid salt.

---

This invention relates to novel guanidine derivatives having urethane linkages represented by the formula,

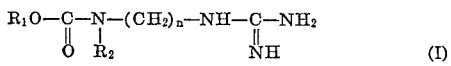

wherein $R_1$ is a lower alkyl, $R_2$ is hydrogen atom or a lower alkyl, and $n$ is 2 or 3, and acid addition salts of the derivatives, and to a process for preparing the same.

More particularly, the invention pertains to a method for the preparation of novel guanidine derivatives and acid addition salts thereof, characterized by reacting in the presence of an acid an N-alkoxycarbonylalkylenediamine derivative represented by the formula,

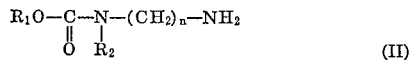

wherein $R_1$, $R_2$ and $n$ have the same significances as above, with an S-alkylisothiourea or cyanamide.

Acid addition salts of (N-alkoxycarbonylaminoalkyl)-guanidine and acid addition salts of (N,N-alkoxycarbonylalkyl-aminoalkyl) guanidine which are obtained according to the present process, are novel compounds and have such useful pharmacological actions as antiviral and blood pressure lowering actions and the like.

It has heretofore been known that certain guanidine derivatives have useful pharmacological actions such as blood pressure lowering actions and antiviral actions, and it is well known that in connection with said derivatives, relatively many compounds have been synthesized and studies for application thereof have been made.

On the other hand, carbamate linkages (urethane linkages) have been well known to give wide biological effects.

However, there have scarcely been known such compounds as those prepared by introducing into guanidine derivatives carbamate linkages.

The present inventors made studies for the purpose of synthesizing such compounds to attain the present compound.

As the acid to be employed in the present process, any of hydrochloric, sulfuric, nitric and acetic acids is usable. Alternatively, however, said acid may have previously been incorporated into the starting compound in the form of acid addition salts, without using free acid. That is, when an S-alkyl-isothiourea is to be used, an acid addition salt of S-alkyl-isothiourea such as S-methyl-isothiourea sulfuric acid salt or S-ethyl-isothiourea hydrobromide, which is readily obtainable and easy in handling, may preferably be used, and the salt may be reacted with the N-alkoxycarbonyl-alkylenediamine derivative (II). Further, when cyanamide is to be used, an acid addition salt of N-alkoxycarbonyl-alkylenediamine derivative may be reacted with the cyanamide.

In the reaction, water, an aqueous alcohol or an alcohol is desirably used as a solvent. The reaction progresses even at room temperature, but proceeds with advantages when the reaction system is heated near to the boiling point of the solvent employed.

The thus obtained N-alkoxycarbonyl-aminoalkyl-guanidine derivative (I) is in the form of an addition salt of the acid employed in the reaction. If necessary, the product may be converted into addition salt of another acid by bringing the product into the form of a free base by use of a strong base such as caustic alkali or the like and then neutralizing with another acid.

As the addition salt-forming acids, there may also be used, in addition to those cited above, any of inorganic and organic acids, such as phosphoric, tartaric, salicylic, ascorbic and citric acids.

Further, the starting N-alkoxycarbonylalkylenediamines of the Formula II can be obtained according to conventional processes. That is, N-alkoxycarbonyl-ethylenediamines such as N-methoxycarbonyl-ethylenediamine, N-butoxycarbonyl-ethylenediamine, and the like, can be obtained by application of a process for preparing N-ethoxycarbonyl-ethylenediamine by condensing ethylenediamine with ethyl chlorocarbonate. Alternatively, they may be obtained according to the process, which has first been developed by the present inventors. That is, N-alkoxycarbonyl - ethylenediamines, N,N - alkoxycarbonyl - alkyl-ethylenediamines, N - alkoxycarbonyl-propylenediamines or N,N-alkoxycarbonyl - alkyl - propylenediamines can be obtained by the reduction of N-alkoxycarbonyl-aminoacetonitriles, N,N - alkoxycarbonyl-alkyl-aminoacetonitriles, N-alkoxycarbonyl-aminopropionitriles or N,N-alkoxycarbonyl-alkyl-aminopropionitriles.

The pharmacological activity of the present compound are shown below.

EFFECT OF GUANIDINE DERIVATIVES ON INFLUENZA A/PR8 IN MICE

| Drug | Dose, mg./kg. | Route of administration | No. of survived No. of treated | Survival (Net) percent |
|---|---|---|---|---|
| $C_2H_5OC(O)-NH-(CH_2)_3-NH-C(NH)-NH_2 \cdot \frac{1}{2}H_2SO_4$ | 60 | SC* | 6/12 | 10 |
| | 30 | SC | 11/14 | 40 |
| $C_2H_5OC(O)-N(CH_3)-(CH_2)_3-NH-C(NH)-NH_2 \cdot \frac{1}{2}H_2SO_4$ | 60 | SC | 5/14 | 0 |
| | 30 | SC | 9/14 | 24 |
| Amantadine | 80 | SC | 11/14 | 40 |
| Control | | | 10/25 | |

NOTE.—* SC means subcutaneous injection.

The following examples illustrate the present invention in further detail, but it is needless to say that the invention is not limited thereto.

EXAMPLE 1

7.7 g. of N-ethoxycarbonyl-propylenediamine and 7.2 g. of S-methylisothiourea sulfate were heated and refluxed for 8 hours in 10 ml. of water. Thereafter, the solvent was removed by distillation and the residue was recrystallized from ethanol to obtain 9.4 of white crystals of a desired (N-ethoxycarbonyl-aminopropyl)-guanidine sulfate, M.P. 134°–137° C.

Elementary analysis for $C_7H_{16}N_4O_2 \cdot \frac{1}{2}H_2SO_4$ (percent): Calc'd: C, 35.46; H, 7.23; N, 23.61. Found: C, 35.79; H, 7.23; N, 23.54.

EXAMPLE 2

8.4 g. of N,N-ethoxycarbonyl-methyl-propylenediamine and 7 g. of S-methylisothiourea sulfate were heated and refluxed for 5.5 hours in 10 ml. of water. After removing the solvent by distillation, the residue was crystallized by use of ethanol and ether, and was then recrystallized from aqueous ethanol to obtain 9.8 g. of white crystals of a desired (N,N-ethoxycarbonylmethyl-aminopropyl)guanidine sulfate, M.P. 95°–97° C.

Elementary analysis for $C_8H_{18}N_4O_2 \cdot \frac{1}{2}H_2SO_4$ (percent): Calc'd: C, 38.24; H, 7.62; N, 22.28. Found: C, 37.69; H, 7.81; N, 22.00.

EXAMPLE 3

9.2 g. of N,N-methoxycarbonyl-butyl-propylenediamine and 7 g. of S-methylisothiourea sulfate were heated and refluxed for 8 hours in 10 ml. of water. The residue was allowed to cool and the deposited crystals were recovered by filtration to obtain 10.0 g. of white crystals of a desired (N,N - methoxycarbonyl-butylaminopropyl)-guanidine sulfate, M.P. approximately 125° C.

Elementary analysis for $C_{10}H_{22}N_4O_2 \cdot \frac{1}{2}H_2SO_4$ (percent): Calc'd: C, 42.99; H, 8.30; N, 20.05. Found: C, 43.37; H, 8.51; N, 20.02.

EXAMPLE 4

5.3 g. of N-ethoxycarbonyl-ethylenediamine and 5.4 g. of S-methylisothiourea sulfate were heated and refluxed for 8 hours in 6 ml. of water. After removing the solvent by distillation, the residue was crystallized by use of ethanol and ether, and was then recrystallized from aqueous ethanol to obtain 5.6 g. of white crystals of a desired (N-ethoxycarbonyl-aminoethyl)-guanidine sulfate, M.P. 149°–150.5° C.

Elementary analysis for $C_6H_{14}N_4O_2 \cdot \frac{1}{2}H_2SO_4$ (percent): Calc'd: C, 32.27; H, 6.76; N, 25.08. Found: C, 32.37; H, 6.72; N, 25.08.

EXAMPLE 5

6.6 g. of N-ethoxycarbonyl-ethylenediamine, 4.2 g. of 75% nitric acid and 2.1 g. of cyanamide were heated and refluxed for 8 hours in 15 ml. of ethanol. After removing the solvent, the residue was recrystallized from aqueous ethanol to obtain 4.5 g. of white crystals of a desired (N-ethoxycarbonyl-aminoethyl)-guanidine nitric acid salt, M.P. 150°–152° C.

Elementary analysis for $C_6H_{14}N_4O_2 \cdot HNO_3$ (percent): Calc'd: C, 30.40; H, 6.37; N, 29.53. Found: C, 30.46; H, 6.76; N, 30.12.

What is claimed is:

1. An (N-alkoxycarbonyl-aminoalkyl)guanidine derivative represented by the formula,

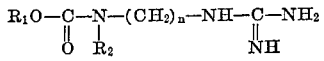

wherein $R_1$ is a lower alkyl, $R_2$ is hydrogen atom or a lower alkyl; and $n$ is 2 or 3, and acid addition salts thereof wherein the acid is selected from the group consisting of hydrohalic, sulfuric, nitric, phosphoric, acetic, tartaric, salicylic, ascorbic and citric acid.

2. An acid addition salt of the compound defined in claim 1 wherein the acid is hydrochloric, hydrobromic, sulfuric, nitric, phosphoric, acetic, tartaric, salicylic, ascorbic or citric acid.

3. A guanidine derivative or acid addition salt thereof according to claim 1 having the formula,

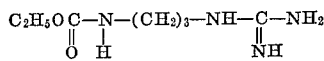

4. A guanidine derivative or acid addition salt thereof according to claim 1 having the formula,

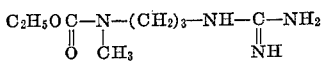

5. A guanidine derivative or acid addition salt thereof according to claim 1 having the formula,

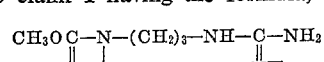

6. A guanidine derivative or acid addition salt thereof according to claim 1 having the formula,

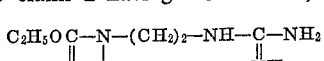

7. A guanidine derivative or acid addition salt thereof according to claim 1 having the formula,

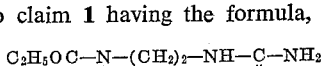

8. A process for preparing (n-alkoxycarbonyl-aminoalkyl)-guanidine derivatives, represented by the formula,

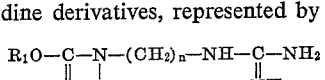

wherein $R_1$ is a lower alkyl, $R_2$ is hydrogen atom or a lower alkyl, and $n$ is 2 or 3, characterized by reacting in the presence of an acid selected from the group consisting of hydrohalic, sulfuric, nitric phosphoric, acetic, tartaric, salicylic, ascorbic and citric acid an N-alkoxycarbonyl-alkylenediamine derivative represented by the formula,

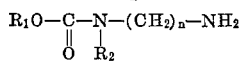

wherein $R_1$, $R_2$ and $n$ have the same significances as defined in claim 1 with an S-alkyl-isothiourea or cyanimide in a 1:1 molar ratio, wherein the reaction is effected using water or an alcohol as a solvent at a temperature ranging from room temperature to the vicinity of the boiling point of the solvent employed.

References Cited
UNITED STATES PATENTS

| | | | |
|---|---|---|---|
| 3,207,780 | 9/1965 | Argoudelis | 260—482 |
| 3,260,747 | 7/1966 | Argoudelis | 260—563 |
| 3,260,749 | 7/1966 | Argoudelis | 260—564 |

CHARLES B. PARKER, Primary Examiner

P. J. KILLOS, Assistant Examiner

U.S. Cl. X.R.

424—300